(12) United States Patent
Zhou et al.

(10) Patent No.: US 11,846,864 B2
(45) Date of Patent: Dec. 19, 2023

(54) FILTER MODULES, COLOR FILTERS, IMAGE SENSORS AND IMAGING DEVICES

(71) Applicant: BOE Technology Group Co., Ltd., Beijing (CN)

(72) Inventors: Jian Zhou, Beijing (CN); Nanfang Jia, Beijing (CN); Yidan Peng, Beijing (CN); Long Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 189 days.

(21) Appl. No.: 17/471,300

(22) Filed: Sep. 10, 2021

(65) Prior Publication Data

US 2022/0082897 A1  Mar. 17, 2022

(30) Foreign Application Priority Data

Sep. 11, 2020 (CN) .......................... 202010954210.X

(51) Int. Cl.
*G02F 1/21* (2006.01)
*G02F 1/1343* (2006.01)
*G02F 1/09* (2006.01)
*G02F 1/01* (2006.01)
*H04N 25/11* (2023.01)

(52) U.S. Cl.
CPC ............ *G02F 1/213* (2021.01); *G02F 1/0147* (2013.01); *G02F 1/092* (2013.01); *G02F 1/13439* (2013.01); *H04N 25/11* (2023.01)

(58) Field of Classification Search
None
See application file for complete search history.

(56) References Cited

U.S. PATENT DOCUMENTS

| | | | |
|---|---|---|---|
| 2018/0052501 A1* | 2/2018 | Jones, Jr. ........... | G02B 27/0176 |
| 2018/0081235 A1* | 3/2018 | Zhao .................... | H10K 50/125 |
| 2019/0033683 A1* | 1/2019 | Ahmed .................... | C23C 16/24 |

* cited by examiner

*Primary Examiner* — Ashok Patel
(74) *Attorney, Agent, or Firm* — IPro, PLLC

(57) ABSTRACT

The present application relates to a filter module, a color filter, an image sensor and an imaging device. The filter module includes: a plurality of color filters and a control component. Each of the color filters includes: a first substrate; a metasurface structure located on the first substrate and including a plurality of microstructures periodically arranged; a dielectric layer located on a side of the metasurface structure away from the first substrate and covering the metasurface structure, wherein a refractive index of the dielectric layer is different from a refractive index of the metasurface structure; a second substrate located on a side of the dielectric layer away from the first substrate. The control component is configured to adjust the refractive index of the dielectric layer so as to adjust wavelengths of visible light passing through the color filter.

20 Claims, 9 Drawing Sheets

FILTER MODULES, COLOR FILTERS, IMAGE SENSORS AND IMAGING DEVICES

CROSS-REFERENCE TO RELATED APPLICATIONS

This application claims priority to Chinese patent application No. 202010954210.X entitled "COLOR FILTERS, IMAGE SENSORS AND IMAGING DEVICES", filed on Sep. 11, 2020, the entire contents of which are incorporated herein by reference.

TECHNICAL FIELD

The present application relates to the field of display technologies, and in particular, to filter modules, color filters, image sensors and imaging devices.

BACKGROUND

With the development of CMOS (Complementary Metal Oxide Semiconductor) technologies, performance of CMOS image sensors has been improved. The CMOS image sensors are developing towards planarization, small size, high resolution and portability. Due to an extendibility of CMOS image sensing technologies, a lateral size of pixels has been reduced from 10 µm to 2 µm. As a pixel size decreases, color filters need to be redesigned to prevent degradation of optical performance.

SUMMARY

The present application provides filter modules, color filters, image sensors, and imaging devices to address the deficiencies existing in the related art.

According to a first aspect of embodiments of the present application, a filter module is provided, including: a plurality of color filters and one or more control components. Each of the color filters includes: a first substrate; a metasurface structure, located on a side of the first substrate and including a plurality of microstructures periodically arranged; a dielectric layer, located on a side of the metasurface structure away from the first substrate and covering the metasurface structure, where a refractive index of the dielectric layer is different from a refractive index of the metasurface structure; and a second substrate located on a side of the dielectric layer away from the first substrate. The one or more control components are configured to adjust the refractive index of the dielectric layers so as to adjust wavelengths of visible light passing through the color filters.

In some embodiments, the dielectric layer is made of an electro-optic material, and the one or more control components each include: a first transparent electrode, located on a side of the first substrate away from the second substrate; a second transparent electrode, located between the second substrate and the dielectric layer; and a controller, configured to control a voltage between the first transparent electrode and the second transparent electrode so as to control a refractive index of the electro-optic material.

In some embodiments, the electro-optic material is a liquid crystal, and the one or more control components each further includes a liquid crystal alignment layer located between the dielectric layer and the second transparent electrode.

In some embodiments, the dielectric layer is made of a thermo-optic material, and the one or more control components correspond to the plurality of color filters one-to-one and each include: a heating plate, located on the first substrate and at least partially surrounding the metasurface structure; a controller, connected to the heating plates and configured to control the heating plate to heat the dielectric layer so as to control a refractive index of the thermo-optic material.

In some embodiments, the thermo-optic material is an SU-8 photoresist, Triazine-based Hyperbranched polymers (TZ001) or PMMA.

In some embodiments, the dielectric layer is made of a magneto-optic material, and the one or more control components correspond to the plurality of color filters one-to-one and each include: a light source; and a controller, connected to the light source and configured to control any one or any combination of a frequency, a polarization state, and a light intensity of light emitted by the light source so as to control a refractive index of the magneto-optic material.

In some embodiments, the magneto-optic material is a ferroelectric material.

In some embodiments, each of the color filters further includes: a first reflector located on a side of the first substrate away from the second substrate; and a second reflector located on a side of the second substrate away from the first substrate, where a space between the first reflector and the second reflector constitutes an optical resonant cavity.

In some embodiments, the first reflector is a distributed Bragg reflector (DBR), and the second reflector is a DBR.

In some embodiments, the first reflector includes a plurality of first film layers and a plurality of second film layers alternately arranged in a direction perpendicular to the first substrate, and the second reflector includes a plurality of first film layers and a plurality of second film layers alternately arranged in the direction perpendicular to the first substrate, where a product of a thickness of the first film layer and a refractive index of the first film layer is a quarter of wavelength of light passing through a corresponding color filter, and a product of a thickness of the second film layer and a refractive index of the second film layer is a quarter of the wavelength of the light passing through the corresponding color filter.

In some embodiments, the first film layers are made of $Si_3N_4$, and the second film layers are made of $SiO_2$; or the first film layers are made of a-Si, and the second film layers are made of $SiO_2$; or the first film layers are made of p-Si, and the second film layers are made of $SiO_2$.

In some embodiments, the microstructures are made of a-Si, p-Si, $Si_3N_4$, $SiO_2$, $TiO_2$ or Ge.

In some embodiments, the microstructures are columnar, and cross-sections of the microstructures are rectangular, square, circular, or elliptical; or the microstructures are spheres or ellipsoids.

In some embodiments, in each of the color filters, the plurality of microstructures are configured to selectively allow red light from incident light to pass through the dielectric layer, or selectively allow green light from the incident light to pass through the dielectric layer, or selectively allow blue light from the incident light to pass through the dielectric layer.

According to a second aspect of the embodiments of the present application, a color filter is provided, including: a first substrate; a metasurface structure, located on a side of the first substrate and including a plurality of microstructures periodically arranged; a dielectric layer, located on a side of the metasurface structure away from the first substrate and covering the metasurface structure, where a refractive index of the dielectric layer is different from a refractive index of the metasurface structure; and a second substrate located on a side of the dielectric layer away from the first substrate.

In some embodiments, the dielectric layer is made of an electro-optic material, a thermo-optic material, or a magneto-optic material.

In some embodiments, the plurality of microstructures are configured to selectively allow red light from incident light to pass through the dielectric layer, selectively allow green light from the incident light to pass through the dielectric layer, or selectively allow blue light from the incident light to pass through the dielectric layer.

In some embodiments, the color filter further includes: a first reflector, located on a side of the first substrate away from the second substrate; and a second reflector, located on a side of the second substrate away from the first substrate, where a space between the first reflector and the second reflector constitutes an optical resonant cavity.

According to a third aspect of the embodiments of the present application, an image sensor is provided, including a filter module and a photosensitive layer. The filter module includes a plurality of color filters and one or more control components. Each of the color filters includes: a first substrate; a metasurface structure, located on a side of the first substrate and including a plurality of microstructures periodically arranged; a dielectric layer, located on a side of the metasurface structure away from the first substrate and covering the metasurface structure, where a refractive index of the dielectric layer is different from a refractive index of the metasurface structure; and a second substrate, located on a side of the dielectric layer away from the first substrate. The one or more control components are configured to adjust the refractive index of the dielectric layer so as to adjust wavelengths of visible light passing through the color filters. The photosensitive layer is located on a side of the first substrate away from the second substrate.

According to a fourth aspect of the embodiments of the present application, an imaging device is provided, including the image sensor as described above.

It should be understood that the above general description and the following detailed description are only exemplary and explanatory and are not intended to limit the present disclosure.

BRIEF DESCRIPTION OF THE DRAWINGS

The accompanying drawings, which are incorporated in and constitute a part of this specification, illustrate embodiments consistent with the present application and, together with the specification, serve to explain the principles of this application.

DETAILED DESCRIPTION OF THE EMBODIMENTS

Figure 1:
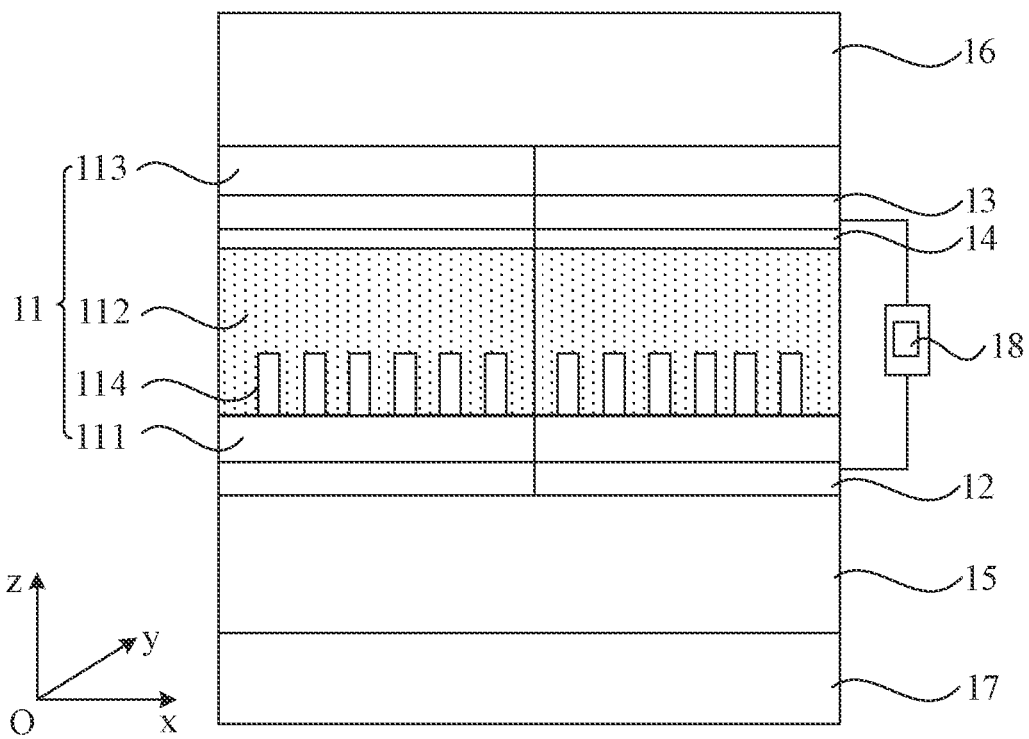
FIG. 1 is a schematic diagram illustrating a structure of a filter module in plane xOz according to an embodiment of the present application.

Exemplary embodiments will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present application. Rather, they are merely examples of apparatuses and methods consistent with some aspects of the present application as detailed in the appended claims.

Conventional color filters adopt polymer dyes for digital color imaging. However, a spectrum of light passing through this kind of color filters is relatively wide, and when a pixel size becomes smaller, optical crosstalk among pixels results from a relatively low absorption coefficient of an organic dye.

Embodiments of the present application provide a filter module. The filter module, as shown in FIG. 1, includes a plurality of color filters 11 and one or more control components. The plurality of color filters 11 each include a first substrate 111, a metasurface structure, a dielectric layer 112 and a second substrate 113.

The metasurface structure is located on a side of the first substrate 111, and the metasurface structure includes a plurality of microstructures 114 periodically arranged. The dielectric layer 112 is located on a side of the metasurface structure away from the first substrate 111, and covers the metasurface structure and a part of the first substrate 111 exposed by the metasurface structure. A refractive index of the dielectric layer 112 is different from that of the metasurface structure. The second substrate 113 is located on a side of the dielectric layer 112 away from the first substrate 111.

In this embodiment, the control component is configured to adjust the refractive index of the dielectric layer 112 so as to adjust wavelengths of visible light passing through the color filters 11.

In this embodiment, since the metasurface structure includes the plurality of microstructures periodically arranged, the metasurface structure can selectively allow light of a specific frequency from incident light to pass through, so that light passing through the color filters has a relatively narrow spectral linewidth and purer color, thus contributing to mitigation of optical crosstalk. Moreover, the one or more control components can adjust the refractive index of the dielectric layer, so that the wavelengths of the visible light passing through the color filters can be adjusted. Therefore, frequencies of light passing through the filter module are adjustable and variable.

The filter module provided according to the embodiments of the present application is described briefly above. Hereinafter, the filter module provided according to the embodiments of the present application will be described in detail.

Embodiments of the present application further provide a filter module. The filter module, as shown in FIG. 1, includes a plurality of color filters 11, one or more control components, a first reflector 15, a second reflector 16 and a third substrate 17. The color filters 11 each include a first substrate 111, a metasurface structure, a dielectric layer 112 and a second substrate 113.

In this embodiment, the first substrate 111 and the second substrate 113 are made of transparent glass, and the third substrate 17 is made of melted $SiO_2$.

In this embodiment, the metasurface structure is located on a side of the first substrate 111. The metasurface structure can be used as a phase modulator for changing a phase of light entering an optical resonant cavity so as to select a specific resonant wavelength. A space between the first reflector 15 and the second reflector 16 constitutes the optical resonant cavity for performing narrow bandpass filtering on visible light passing through the color filters 11.

In this embodiment, the metasurface structure includes a plurality of microstructures 114 periodically arranged. In this embodiment, the microstructures 114 are made of $TiO_2$. The microstructures 114 are columnar, and cross-sections of the microstructures 114 are circular. A cross-sectional area of each microstructure 114 and a distance between any two adjacent microstructures 114 can affect a wavelength of the visible light passing through the color filter 11.

In another embodiment, the microstructures 114 are columnar, and cross-sections of the microstructures 114 are elliptical.

In another embodiment, the microstructures 114 are cuboids or cubes.

In another embodiment, the microstructures 114 are spheres or ellipsoids.

In another embodiment, the microstructures 114 are made of a-Si, p-Si, $Si_3N_4$, $SiO_2$ or Ge.

In this embodiment, as shown in FIG. 1, the dielectric layer 112 is located on a side of the metasurface structure away from the first substrate 111, and covers the metasurface structure and a part of the first substrate 111 exposed by the metasurface structure. A refractive index of the dielectric layer 112 is different from that of the metasurface structure.

In this embodiment, the dielectric layer 112 is made of an electro-optic material, e.g., a liquid crystal. The liquid crystal may be a nematic liquid crystal (E7). The nematic liquid crystal (E7) has an ordinary refractive index of 1.5 and an extraordinary refractive index of 1.7.

As shown in FIG. 1, the one or more control components include a first transparent electrode 12, a second transparent electrode 13, a liquid crystal alignment layer 14 and a controller 18. The first transparent electrode 12 is located on a side of the first substrate 111 away from the second substrate 113. The second transparent electrode 13 is located between the second substrate 113 and the dielectric layer 112. The liquid crystal alignment layer 14 is located between the dielectric layer 112 and the second transparent electrode 13. The controller 18 is configured to control a voltage between the first transparent electrode 12 and the second transparent electrode 13 so as to control a refractive index of the liquid crystal. The voltage between the first transparent electrode 12 and the second transparent electrode 13 can be provided by a correspondingly connected power supply. In an embodiment, the controller may be a variable resistor, a potentiometer or other elements or devices capable of performing similar functions, but is not limited thereto.

In this embodiment, the second substrate 113 is located on a side of the dielectric layer 112 away from the first substrate 111.

In this embodiment, the one or more control components are configured to adjust the refractive index of the liquid crystal so as to adjust the wavelengths of the visible light passing through the color filters 11.

In this embodiment, the first reflector 15 is located on a side of the first substrate 111 away from the second substrate 113, and the second reflector 16 is located on a side of the second substrate 113 away from the first substrate 111.

In this embodiment, the optical resonant cavity is a Fabry-Perot resonant cavity (F-P resonant cavity), i.e., a plane parallel cavity. The first reflector 15 is a distributed Bragg reflector (DBR). The first reflector 15 includes a plurality of first film layers and a plurality of second film layers alternately arranged in direction z perpendicular to the first substrate 111. The first substrate 111 is in plane xOy. A refractive index of the first film layers is different from that of the second film layers, and the greater a difference between the refractive index of the first film layers and the refractive index of the second film layers is, the better the narrow bandpass filtering effect is. A product of a thickness of the first film layer and the refractive index of the first film layer equals a quarter of the wavelength of the visible light passing through the color filters 11. A product of a thickness of the second film layer and the refractive index of the second film layer equals a quarter of the wavelength of the visible light passing through the color filters 11.

In this embodiment, the second reflector 16 is a DBR. The second reflector 16 includes a plurality of the first film layers and a plurality of the second film layers alternately arranged in direction z perpendicular to the first substrate 111.

In this embodiment, the first film layers are made of $Si_3N_4$, and the second film layers are made of $SiO_2$. In another embodiment, the first film layers are made of a-Si, and the second film layers are made of $SiO_2$. In yet another embodiment, the first film layers are made of p-Si, and the second film layers are made of $SiO_2$.

It should be noted that increasing a number of the first film layers and a number of the second film layers can improve a quality factor (Q-factor) of a resonant peak of the filter module, thereby increasing a resolution of color identification.

In this embodiment, the filter module includes two reflectors (the first reflector 15 and the second reflector 16). In another embodiment, the filter module can include a different number of reflectors, e.g., 3 reflectors or 4 reflectors, but is not limited thereto.

Figure 2:
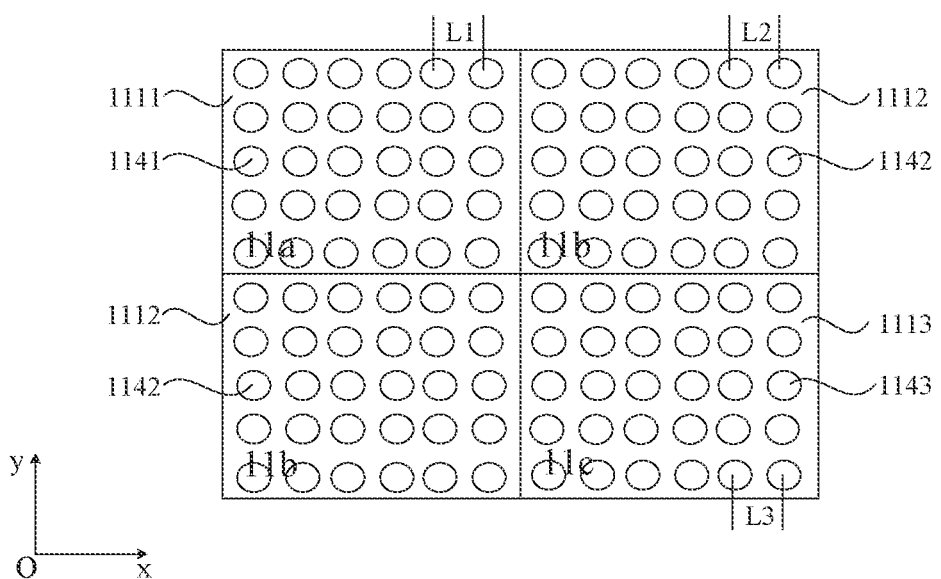
FIG. 2 is a schematic diagram illustrating a structure of a filter module in plane xOy according to an embodiment of the present application.

In this embodiment, the plurality of color filters 11 includes one first color filter 11a, two second color filters 11b and one third color filter 11c. Diagonals of the two second color filters 11b are substantially on a same line. A diagonal of the first color filter 11a and a diagonal of the third color filter 11c are substantially on a same line. In an embodiment, as shown in FIG. 2, the first color filter 11a, the two second color filters 11b and the third color filter 11c are rectangles with a same shape and size. The two second color filters 11b are arranged along a diagonal, and the first color filter 11a and the third color filter 11c are arranged along another diagonal.

In this embodiment, the plurality of microstructures 114 are periodically arranged at an interval in direction x. As shown in FIG. 2, a metasurface structure of the first color filter 11a includes a plurality of first microstructures 1141 periodically arranged at a first interval L1 in direction x. Metasurface structures of the two second color filters 11b each include a plurality of second microstructures 1142 periodically arranged at a second interval L2 in direction x. A metasurface structure of the third color filter 11c includes a plurality of third microstructures 1143 periodically arranged at a third interval L3 in direction x. The first microstructures 1141 are located on a first substrate 1111 of the first color filter 11a. The second microstructures 1142 are located on first substrates 1112 of the two second color filters 11b. The third microstructures 1143 are located on a first substrate 1113 of the third color filter 11c.

In this embodiment, as shown in FIG. 2, the first color filter 11a includes five rows and six columns of the first microstructures 1141, the two second color filters 11b each include five rows and six columns of the second microstructures 1142, and the third color filter 11c includes five rows and six columns of the third microstructures 1143, but the arrangements of the microstructures are not limited thereto. A number of the microstructures in each of the color filters can be set according to actual requirements, and is not limited herein.

In this embodiment, in direction z, the first microstructures 1141, the second microstructures 1142, and the third microstructures have a same height.

In this embodiment, the first microstructures 1141 are configured to selectively allow red light from incident light to pass through the dielectric layer 112. The second microstructures 1142 are configured to selectively allow green light from the incident light to pass through the dielectric layer 112. The third microstructures 1143 are configured to selectively allow blue light from the incident light to pass through the dielectric layer 112.

It should be noted that by changing thicknesses and materials of the first film layers and the second film layers, combining with metasurface structures made of various materials, a working range of the filter module can be extended to any wavelength.

The filter module in the embodiments of the present invention is described above. Hereinafter, experimental simulation results of the filter module are described. A filter module includes a first reflector 15, a second reflector 16 and a plurality of color filters 11. In an embodiment, the plurality of color filters 11 include one first color filter 11a, two second color filters 11b and one third color filter 11c, and the color filters each include: a first substrate 111, a second substrate 113, a metasurface structure and a dielectric layer 112. A metasurface structure in the first color filter 11a includes a plurality of first microstructures 1141, metasurface structures in the two second color filters 11b each include a plurality of second microstructures 1142, and a metasurface structure in the third color filter 11c includes a plurality of third microstructures 1143. The first microstructures 1141, the second microstructures 1142 and the third microstructures 1143 are made of $TiO_2$. The dielectric layer 112 is made of nematic liquid crystal (E7), and the liquid crystal molecules rotate in plane xOz. The first substrate 111 and the second substrate 113 are made of transparent glass, and a refractive index of the transparent glass is 1.45. The first reflector 15 includes 8 first film layers and 8 second film layers alternately arranged in direction z, and the second reflector 16 includes 8 first film layers and 8 second film layers alternately arranged in direction z. The first film layers are made of $Si_3N_4$, and the second film layers are made of $SiO_2$. A refractive index of $Si_3N_4$ is 2.01, and a refractive index of $SiO_2$ is 1.45.

Figure 3:
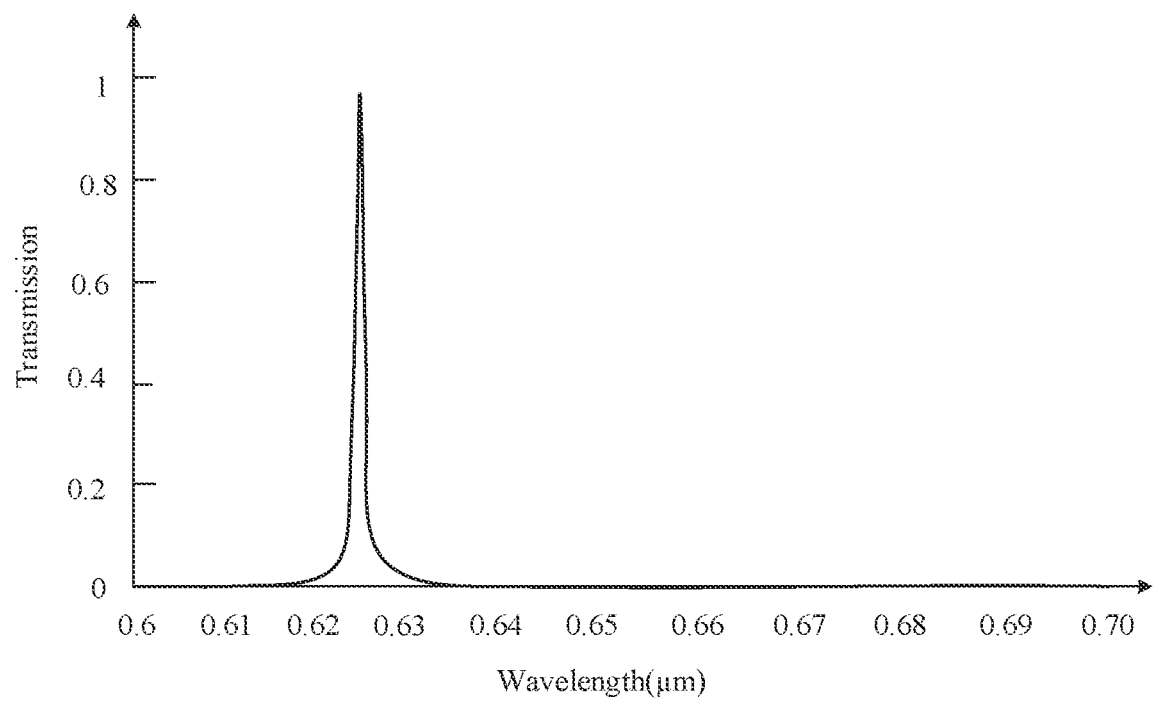
FIG. 3 is a transmission spectrum of a red filter according to an embodiment of the present application.

In the first color filter 11a, a first interval L1 of the first microstructures 1141 is 320 nm (nanometers). The first microstructures 1141 are cylinders, and each have a cross-section perpendicular to direction z with a radius of 80 nm. The first film layers each have a thickness of 82 nm, and the second film layers each have a thickness of 114 nm. The first microstructures 1141 and parts of other film layers whose orthographic projections are within a corresponding first substrate 1111 constitute a red filter. A transmission spectrum of the red filter, as shown in FIG. 3, has a relatively narrow bandwidth, with a central wavelength of about 0.625 μm. In FIG. 3, a horizontal axis represents wavelengths, and a vertical axis represents transmittances.

Figure 4:
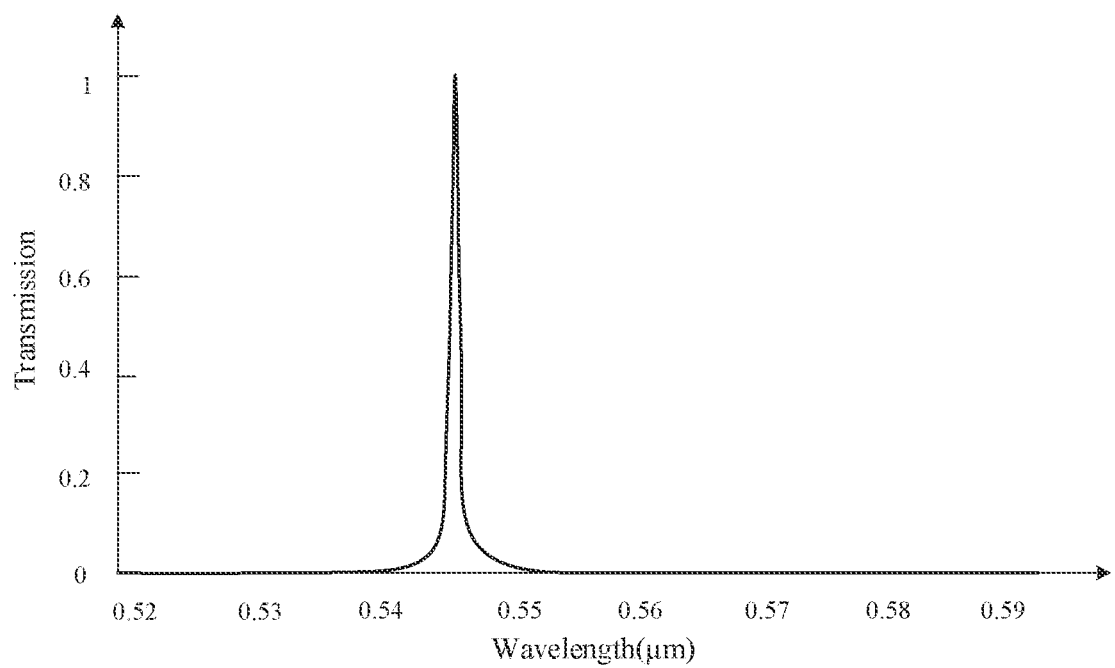
FIG. 4 is a transmission spectrum of a green filter according to an embodiment of the present application.

In each of the second color filters 11b, a second interval L2 of the second microstructures 1142 is 250 nm. The second microstructures 1142 are cylinders, and each have a cross-section perpendicular to direction z with a radius of 80 nm. The first film layers each have a thickness of 66 nm, and the second film layers each have a thickness of 92 nm. The second microstructures 1142 and parts of other film layers whose orthographic projections are within a corresponding first substrate 1112 constitute a green filter. A transmission spectrum of the green filter, as shown in FIG. 4, has a relatively narrow bandwidth, with a central wavelength of about 0.545 μm. In FIG. 4, a horizontal axis represents wavelengths, and a vertical axis represents transmittances.

Figure 5:
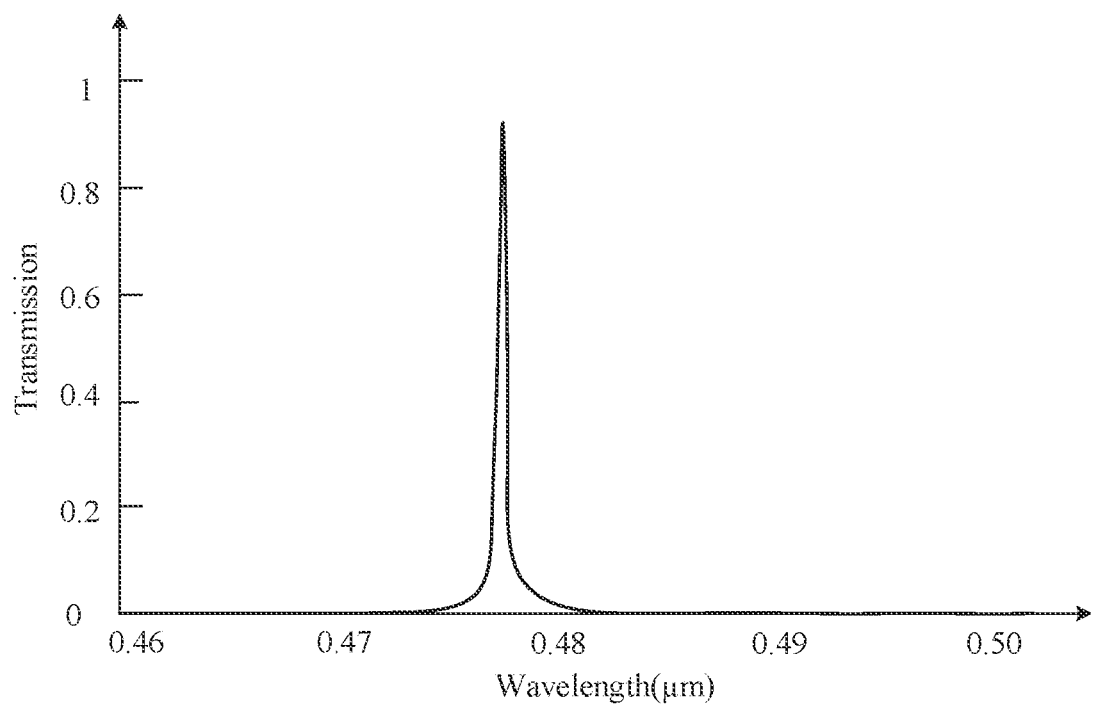
FIG. 5 is a transmission spectrum of a blue filter according to an embodiment of the present application.

In the third color filter 11c, a third interval L3 of the third microstructures 1143 is 200 nm. The third microstructures 1143 are cylinders, and each have a cross-section perpendicular to direction z with a radius of 70 nm. The first film layers each have a thickness of 56 nm, and the second film layers each have a thickness of 78 nm. The third microstructures 1143 and parts of other film layers whose orthographic projections are within a corresponding first substrate 1113 constitute a blue filter. A transmission spectrum of the blue filter, as shown in FIG. 5, has a relatively narrow bandwidth, with a central wavelength of approximately 0.48 μm. In FIG. 5, a horizontal axis represents wavelengths, and a vertical axis represents transmittances.

Figure 6:
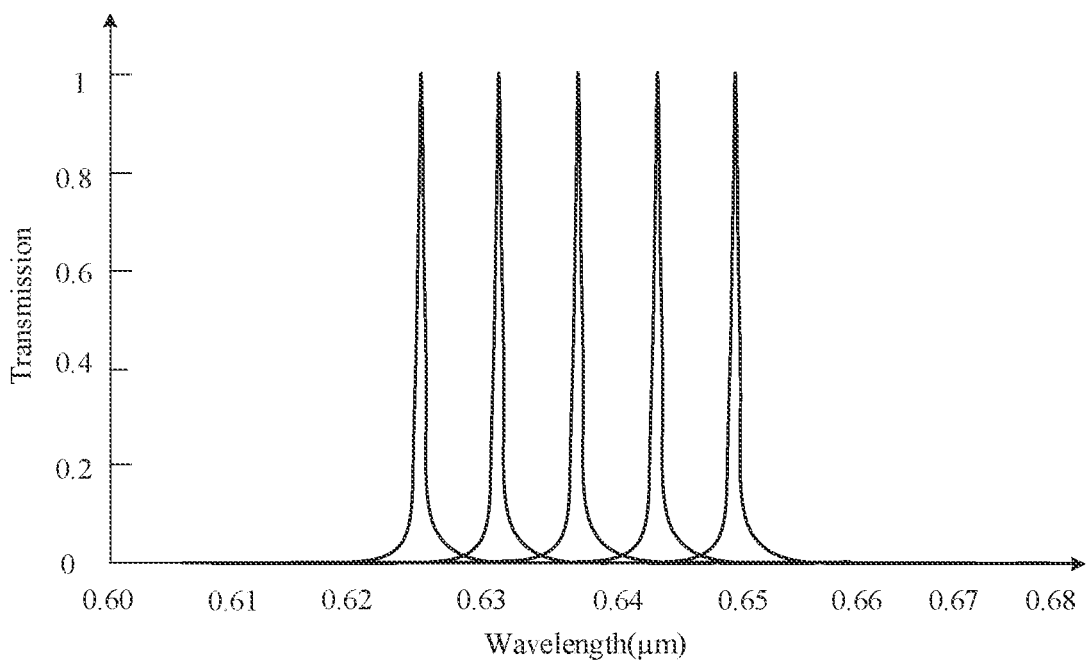
FIG. 6 is a transmission spectrum of a red filter according to another embodiment of the present application.
Figure 7:
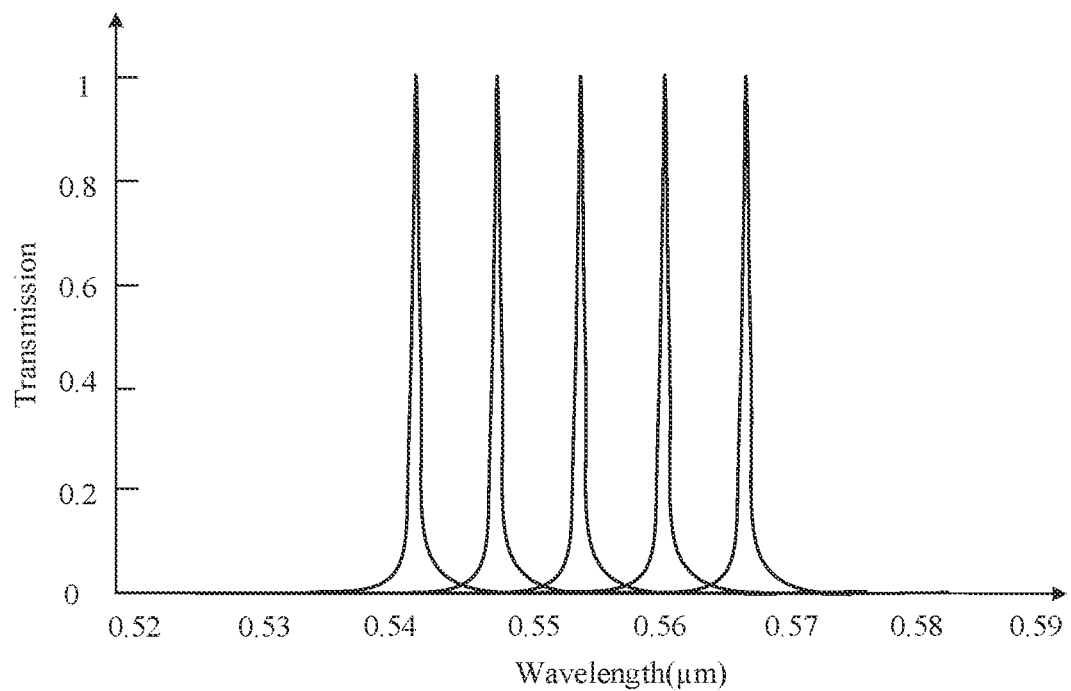
FIG. 7 is a transmission spectrum of a green filter according to another embodiment of the present application.
Figure 8:
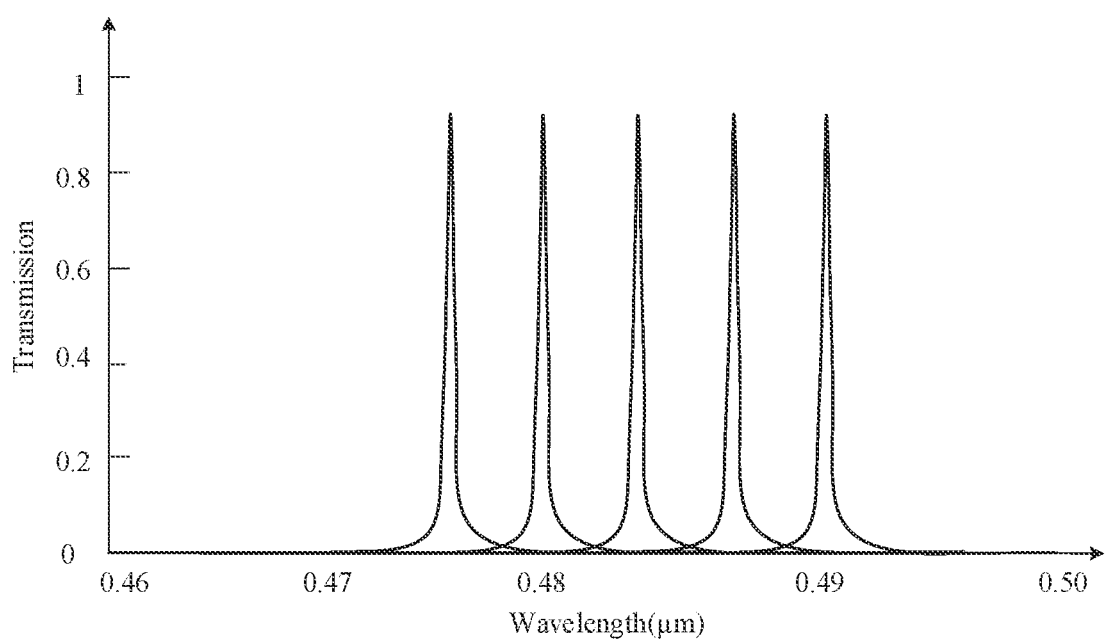
FIG. 8 is a transmission spectrum of a blue filter according to another embodiment of the present application.

By changing a voltage between a first transparent electrode 12 and a second transparent electrode 13, a deflection angle of the liquid crystal molecules can be changed, thereby changing a refractive index of the liquid crystal. In this way, wavelengths of visible light passing through the red filter, the green filter, and the blue filter can be shifted, thereby dynamically constructing a function of the filter module. For details, reference may be made to FIGS. 6 to 8. FIG. 6 is a transmission spectrum of the red filter, FIG. 7 is a transmission spectrum of the green filter, and FIG. 8 is a transmission spectrum of the blue filter. It can be seen from FIGS. 6 to 8 that each spectral line in the transmission spectrum of the red filter is relatively narrow in width, with a higher transmittance and a wavelength range of 0.635 μm~0.67 μm, each spectral line in the transmission spectrum of the green filter is relatively narrow in width, with a higher transmittance and a wavelength range of 0.54 μm~0.57 μm, and each spectral line in the transmission spectrum of the blue filter is relatively narrow in width, with a higher transmittance and a wavelength range of 0.47 μm~0.49 μm.

By comparison, it can be seen that wavelength ranges of red light passing through the red filter, green light passing through the green filter, and blue light passing through the blue filter have great intervals therebetween and do not overlap with each other. As a result, no optical crosstalk occurs.

Moreover, in this embodiment, a rectangular region composed of the first color filter 11a, the two second color filters 11b, and the third color filter 11c has a width of about 3 µm in direction x and about 3 µm in direction y. That is, a filter module for one pixel has a size of 3*3 µm, much smaller than a filter of 10*10 µm in size for one pixel in the related art, which helps to reduce a pixel size. It should be noted that the pixel here may be a photosensitive unit for acquiring image data.

In this embodiment, since the metasurface structure includes the plurality of microstructures 114 periodically arranged, the metasurface structure can selectively allow light of a specific frequency from incident light to pass, so that light passing through the color filters 11 has a relatively narrow spectral linewidth and purer in color, thus contributing to mitigation of optical crosstalk. Moreover, the one or more control components can adjust the refractive index of the dielectric layer, so that wavelengths of visible light passing through the color filters can be adjusted. Therefore, frequencies of light passing through the filter module are adjustable and variable.

Embodiments of the present application further provide a filter module. In this embodiment, a dielectric layer 112 is made of a thermo-optic material. The thermo-optic material may be, for example, SU-8, TZ001 or polymethyl methacrylate (PMMA). The SU-8 is an epoxy resin, with an average of 8 epoxy groups per molecule. The TZ001 refers to Triazine-based Hyperbranched polymer.

Figure 9:
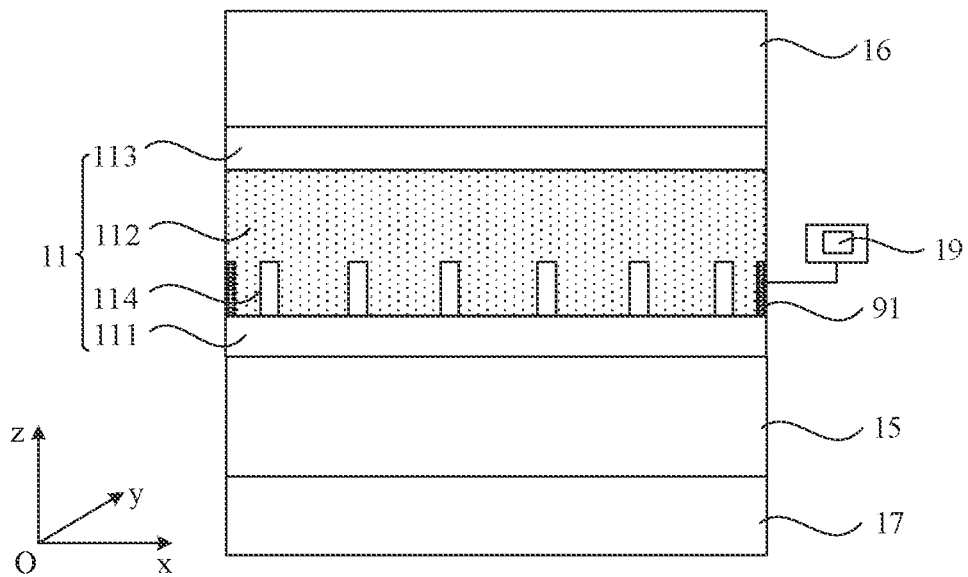
FIG. 9 is a schematic diagram illustrating a partial structure of a filter module in plane xOz according to another embodiment of the present application.
Figure 10:
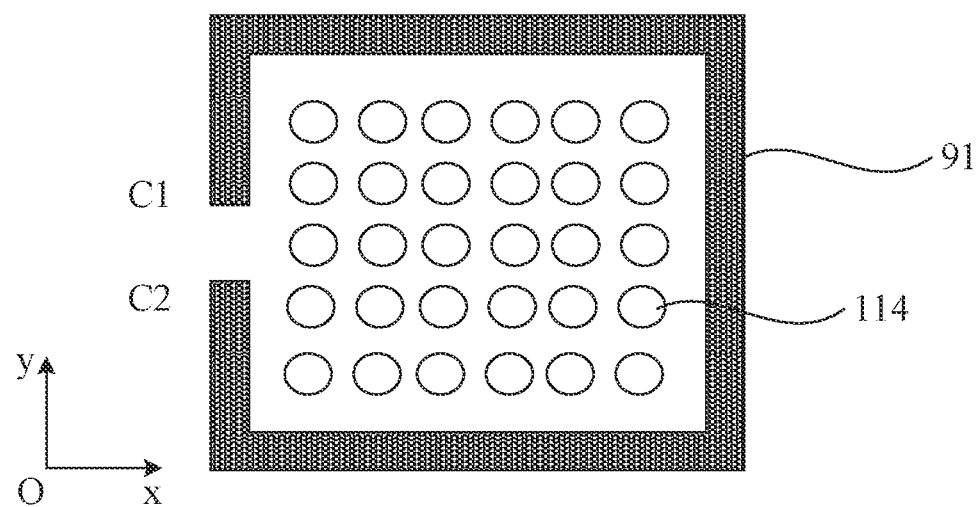
FIG. 10 is a schematic diagram illustrating a partial structure of a filter module in plane xOy according to another embodiment of the present application.

In this embodiment, as shown in FIGS. 9 to 10, the one or more control components correspond to the plurality of color filters one-to-one and each includes a heating plate 91 and a controller 19. A heating plate 91 is located on a corresponding first substrate 111, at least partially surrounds a corresponding metasurface structure, and is connected to a corresponding controller 19. The controller 19 is configured to control the heating plate 91 to heat the dielectric layer 112 so as to control a refractive index of the thermo-optic material, thereby adjusting a wavelength of visible light passing through the color filter 11, and finally adjusting wavelengths of visible light passing through the filter module. The refractive index of the thermo-optic material varies with a temperature of the dielectric layer 112. In an embodiment, the controller may be a variable resistor, but it is not limited thereto.

In this embodiment, as partial structure of the filter module shown in FIG. 10, each of the heating plates 91 is a square frame, and includes a first end C1 and a second end C2. The first end C1 is connected to the first electrode. The second end C2 is connected to the second electrode. The first electrode and the second electrode are connected to a corresponding power supply. When the power supply supplies the heating plates 91 with electricity, the heating plates 91 are in a heating state. In other embodiments, the heating plates 91 may be in any shape that can achieve a desired heating effect, such as a ring shape or a clip shape, which is not limited herein.

In this embodiment, the heating plates 91 are made of lithiated cadmium, but they are not limited thereto.

In this embodiment, the color filters 11 each includes one first color filter 11a, two second color filters 11b, and one third color filter 11c as described in the above embodiment, each of the four single color filters 11 is provided with one of the heating plates 91 for heating the dielectric layer 112 therein so as to control a refractive index of the dielectric layer 112 in each of the color filters 11, thereby adjusting a wavelength of visible light passing through each of the color filters 11, and finally adjusting wavelengths of visible light passing through the filter module. In some embodiments, a number of the heating plates 91 and a correspondence between arrangements of the heating plates 91 and the color filters 11 can be set according to actual requirements, and are not limited herein.

In this embodiment, since the metasurface structures each include a plurality of microstructures 114 periodically arranged, the metasurface structures can selectively allow light of a specific frequency from incident light to pass, so that light passing through the plurality of color filters 11 has a relatively narrow spectral linewidth and purer color, thus contributing to mitigation of optical crosstalk. Moreover, the one or more control components can adjust the refractive index of the dielectric layer, so that wavelengths of the visible light passing through the color filters can be adjusted. Therefore, frequencies of light passing through the filter module are adjustable and variable.

According to embodiments of the present application, another filter module is provided. In this embodiment, a dielectric layer 112 is made of a magneto-optic material. For example, the magneto-optic material is a ferroelectric material. When light passes through the magneto-optic material, a refractive index of the magneto-optic material can be changed.

Figure 11:
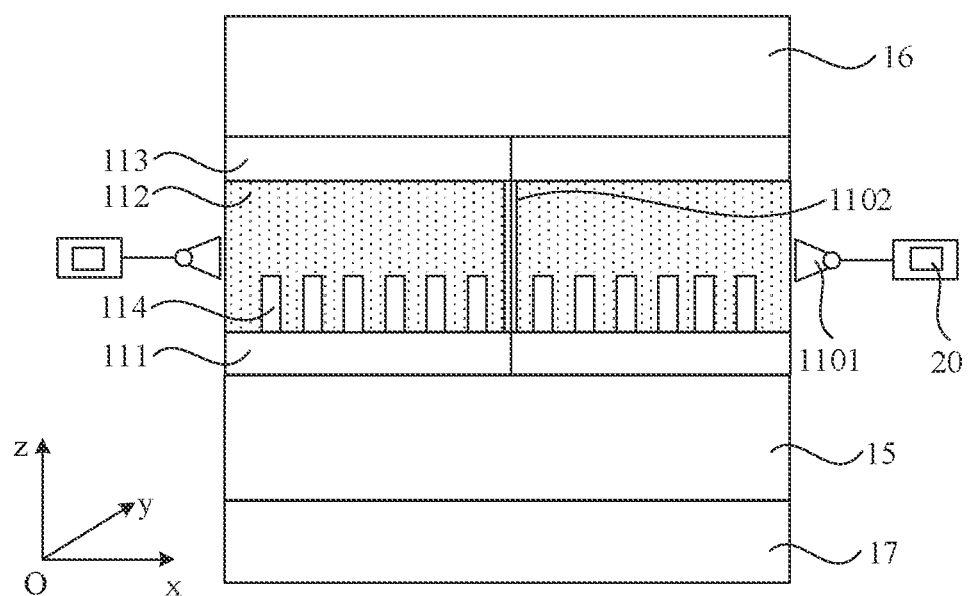
FIG. 11 is a schematic diagram illustrating a structure of a filter module in plane xOz according to yet another embodiment of the present application.

In this embodiment, as shown in FIG. 11, one or more control components correspond to the plurality of color filters one-to-one and each include a controller 20 and a light source 1101. The light source 1101 is connected to the controller 20. The controller 20 is configured to control a frequency, a polarization state and/or a light intensity of light emitted by the light source 1101 so as to control the refractive index of the magneto-optic material, thereby adjusting a wavelength of visible light passing through the color filters 11, and finally adjusting wavelengths of visible light passing through the filter module. It should be noted that the controllers 20 can be configured to control any one or more of the frequency, the polarization state and/or the light intensity of light emitted by the light sources 1101 so as to control the refractive index of the magneto-optic material. In an embodiment, the controller 20 may be an adjustable resistor.

In this embodiment, orthographic projections of the light sources 1101 onto plane xOy are outside that of a first reflector 15. In this way, effect of the light sources 1101 on the visible light passing through the filter module can be reduced.

In this embodiment, the color filters 11 each includes one first color filter 11a, two second color filters 11b, and one third color filter 11c as described in the above embodiment (that is, four single color filters), each of the one first color filter 11a, two second color filters 11b, and one third color filter 11c corresponds to one light source 1101, and a light blocking plate 1102 is provided between dielectric layers in two adjacent color filters to avoid light emitted by a light source 1101 corresponding to one color filter from affecting a refractive index of a dielectric layer 112 in the other color filter.

In this embodiment, since a metasurface structure includes a plurality of microstructures periodically arranged, the metasurface structure can selectively allow light of a specific frequency from incident light to pass, so that light passing through the color filters has a relatively narrow spectral linewidth and purer color, thus contributing to mitigation of optical crosstalk. Moreover, the one or more control components can adjust the refractive index of the dielectric layer, so that the wavelengths of the visible light passing through the color filters can be adjusted. Therefore, frequencies of light passing through the filter module are adjustable and variable.

Embodiments of the present application further provide a color filter. As shown in FIGS. 1, 9 and 11, the color filter 11 includes a first substrate 111, a metasurface structure, a dielectric layer 112, and a second substrate 113.

The metasurface structure is located on a side of the first substrate 111. The metasurface structure includes a plurality of microstructures 114 periodically arranged. The dielectric layer 112 is located on a side of the metasurface structure away from the first substrate 111, and covers the metasurface structure and a part of the first substrate 111 exposed by the metasurface structure. A refractive index of the dielectric layer 112 is different from that of the metasurface structure. The second substrate 113 is located on a side of the dielectric layer 112 away from the first substrate 111.

In an embodiment, the color filter further includes the above-mentioned first reflector and second reflector.

Figure 12:
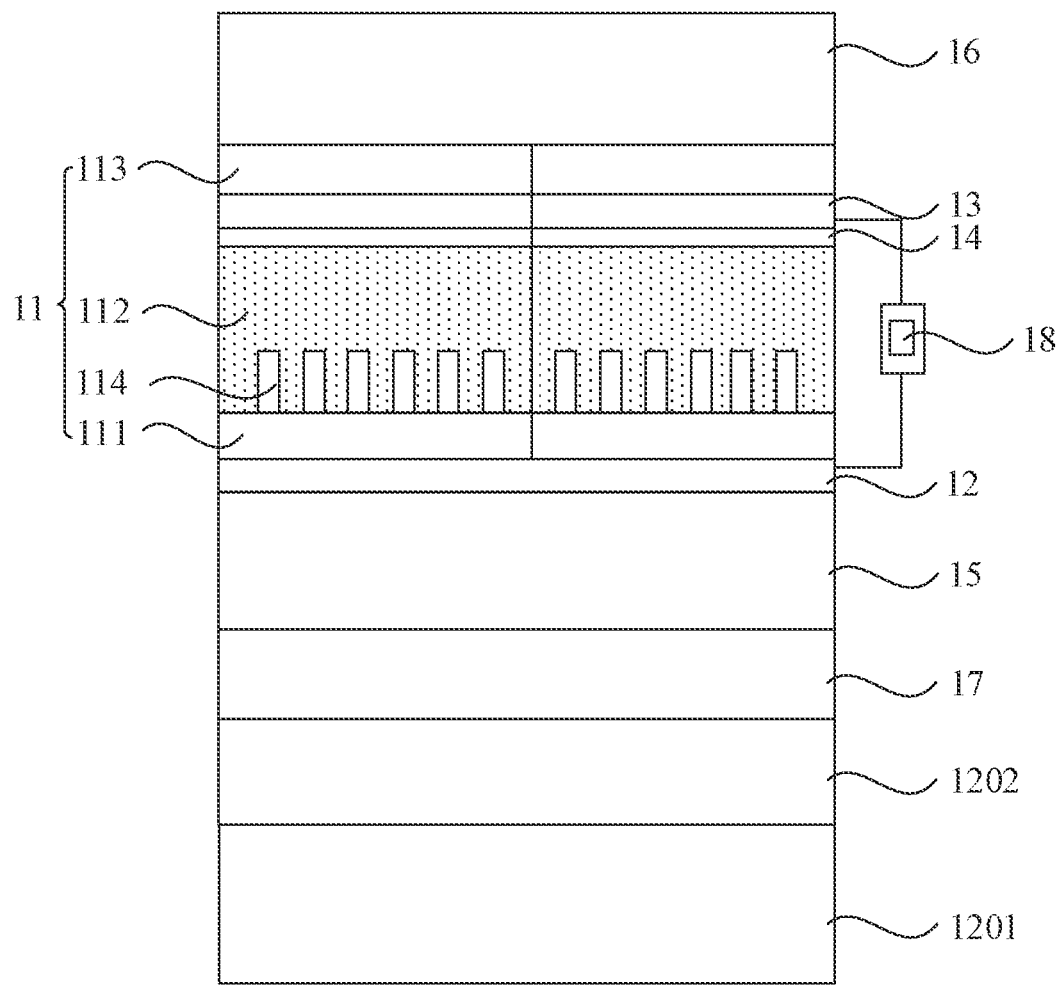
FIG. 12 is a schematic structure diagram illustrating an image sensor according to an embodiment of the present application.
Figure 13:
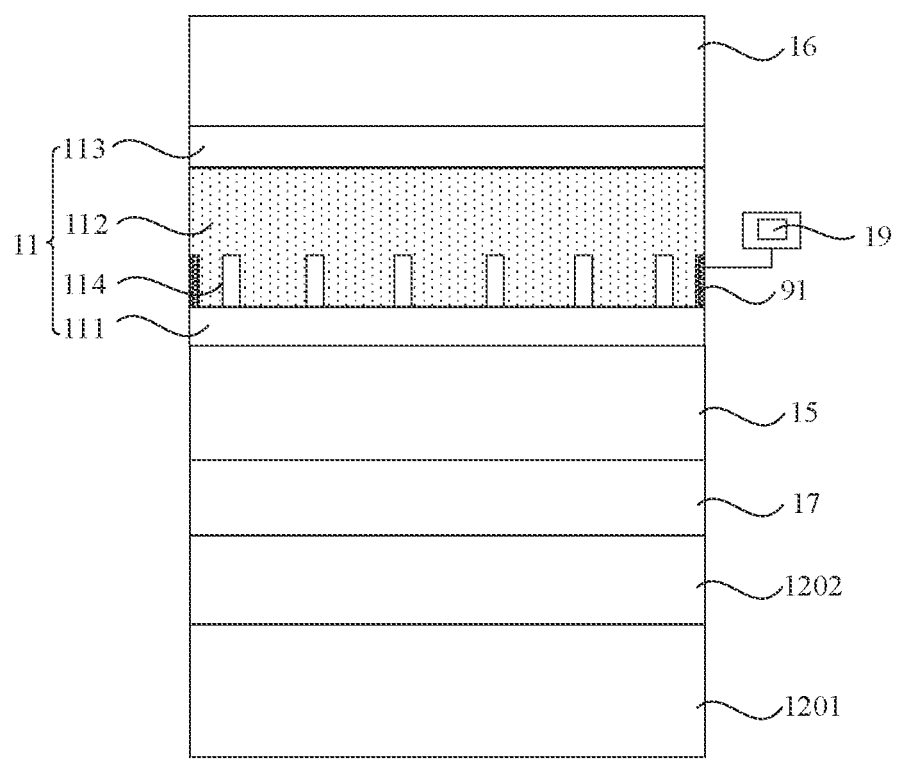
FIG. 13 is a schematic diagram illustrating a partial structure of an image sensor according to yet another embodiment of the present application.
Figure 14:
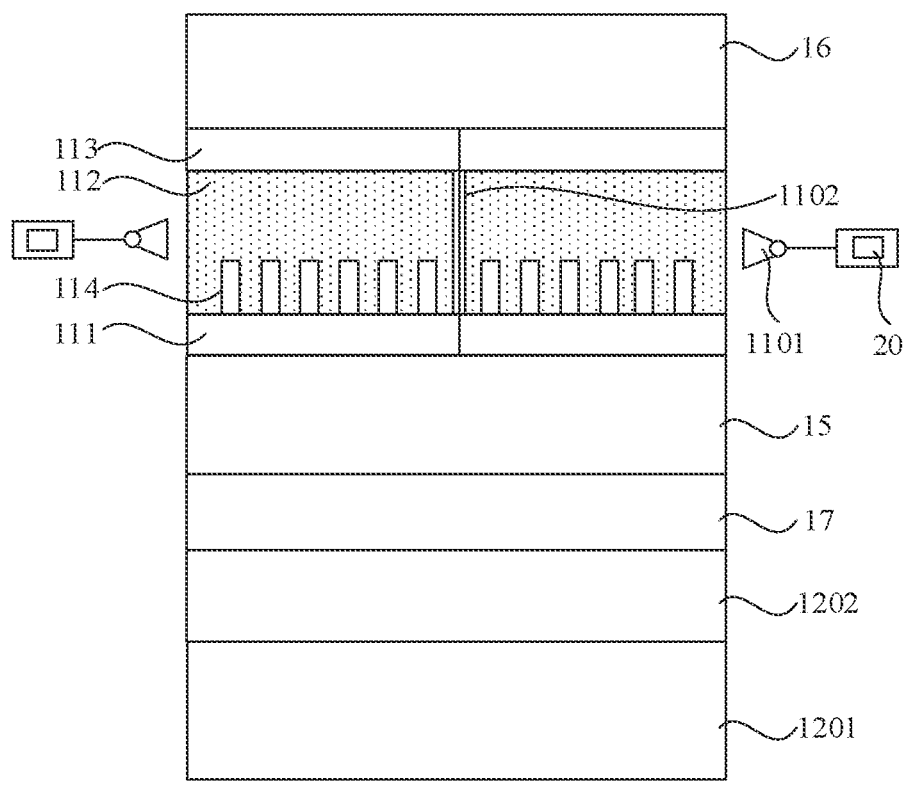
FIG. 14 is a schematic structure diagram illustrating an image sensor according to still another embodiment of the present application.

Embodiments of the present application further provide an image sensor. As shown in FIGS. 12, 13 and 14, the image sensor includes a photosensitive layer 1201, and a filter module described in any of the above embodiments. The photosensitive layer 1201 is located on a side of the first substrate 111 away from the second substrate 113.

In this embodiment, the photosensitive layer 1201 includes photodiodes arranged in array.

In this embodiment, the image sensor further includes a buffer layer 1202. The buffer layer 1202 is located between the photosensitive layer 1201 and the filter module. In an embodiment, the buffer layer 1202 is located between the photosensitive layer 1201 and the third substrate 17. The buffer layer 1202 is made of silicon dioxide.

In this embodiment, the image sensor may be a CMOS image sensor. A process for preparing the filter module is compatible with that of CMOS, which is convenient for preparation.

In this embodiment, since a metasurface structure in the filter module includes a plurality of microstructures periodically arranged, the metasurface structure can selectively allow light of a specific frequency from incident light to pass, so that light passing through color filters has a relatively narrow spectral linewidth and purer color. The image sensor using the filter module can more advantageously alleviate optical crosstalk. Moreover, one or more control components in the filter module can adjust a refractive index of a dielectric layer, so that wavelengths of visible light passing through the color filter can be adjusted. Therefore, frequencies of light passing through the filter module are adjustable and variable, which enables the image sensor to acquire high-quality and colorful images.

Embodiments of the present application further provide an imaging device, including an image sensor described in any of the above embodiments.

In this embodiment, since a metasurface structure in a filter module includes a plurality of microstructures periodically arranged, the metasurface structure can selectively allow light of a specific frequency from incident light to pass, so that light passing through color filters has a relatively narrow spectral linewidth and purer color. Using an image sensor with the filter module is advantageous to alleviate optical crosstalk in the imaging device. Moreover, a control component in the filter module can adjust a refractive index of a dielectric layer, so that wavelengths of visible light passing through the color filters can be adjusted. Therefore, frequencies of light passing through the filter module are adjustable and variable, which enables the imaging device to acquire high-quality and colorful images.

It is noted that in the drawings, sizes of layers and regions may be exaggerated for clarity of illustration. It will also be understood that when an element or layer is referred to as being "on" another element or layer, it can be directly on the another element or layer, or one or more intermediate layers or elements may be present therebetween. In addition, it will be understood that when an element or layer is referred to as being "below" another element or layer, it can be directly below the another element or layer, or one or more intermediate layers or elements may be present. It will also be understood that when a layer or element is referred to as being "between" two layers or elements, it can be the only layer or element between the two layers or elements, or more than one intermediate layer or element may be present between the two layers or elements. Similar reference signs indicate similar elements or layers throughout.

In the present application, the terms "first" and "second" are used only for descriptive purposes, and cannot be understood as indicating or implying relative importance and order. The terms "plurality" and "multiple" refer to two or more, unless specifically defined otherwise.

Other embodiments of the present application will be readily apparent to those skilled in the art after considering the specification and practicing the contents disclosed herein. The present application is intended to cover any variations, usage, or adaptations of the present application, which follow the general principle of the present application and involve common knowledge or conventional technical means in the art that are not disclosed in the present application. The specification and embodiments are to be regarded as illustrative only. The true scope and spirit of the present application are pointed out by the following claims.

The invention claimed is:

1. A filter module, comprising:
   a plurality of color filters, wherein each of the color filters comprises:
      a first substrate,
      a metasurface structure, located on a side of the first substrate and comprising a plurality of microstructures periodically arranged,
      a dielectric layer, located on a side of the metasurface structure away from the first substrate and covering the metasurface structure, wherein a refractive index of the dielectric layer is different from a refractive index of the metasurface structure and the dielectric layer is made of a thermo-optic material, and
      a second substrate, located on a side of the dielectric layer away from the first substrate; and
   one or more control components, configured to adjust refractive indexes of dielectric layers so as to adjust wavelengths of visible light passing through the color filters;
   wherein the one or more control components correspond to the plurality of color filters one-to-one and each comprise:
   a heating plate, located on the first substrate and at least partially surrounding the metasurface structure;
   a controller, connected to the heating plate and configured to control the heating plate to heat the dielectric layer so as to control a refractive index of the thermo-optic material.

2. The filter module according to claim 1 wherein the thermo-optic material is an SU-8 photoresist, Triazine-based Hyperbranched polymers (TZ001) or PMMA.

3. The filter module according to claim 1, wherein each of the color filters further comprises:
  a first reflector, located on a side of the first substrate away from the second substrate; and
  a second reflector, located on a side of the second substrate away from the first substrate,
  wherein a space between the first reflector and the second reflector constitutes an optical resonant cavity.

4. The filter module according to claim 3, wherein the first reflector is a distributed Bragg reflector (DBR), and the second reflector is a DBR.

5. The filter module according to claim 4, wherein the first reflector comprises a plurality of first film layers and a plurality of second film layers alternately arranged in a direction perpendicular to the first substrate, and the second reflector comprises a plurality of first film layers and a plurality of second film layers alternately arranged in the direction perpendicular to the first substrate,
  wherein a product of a thickness and a refractive index of each of the first film layers is a quarter of a wavelength of light passing through a corresponding color filter, and a product of a thickness and a refractive index of each of the second film layers is a quarter of the wavelength of the light passing through the corresponding color filter.

6. The filter module according to claim 5, wherein
  the first film layers are made of $Si_3N_4$, and the second film layers are made of $SiO_2$; or
  the first film layers are made of a-Si, and the second film layers are made of $SiO_2$; or
  the first film layers are made of p-Si, and the second film layers are made of $SiO_2$.

7. The filter module according to claim 1, wherein the microstructures are made of a-Si, p-Si, $Si_3N_4$, $SiO_2$, $TiO_2$ or Ge.

8. The filter module according to claim 1, wherein
  the microstructures are columnar, and cross-sections of the microstructures are rectangular, square, circular or elliptical; or
  the microstructures are spheres or ellipsoids.

9. The filter module according to claim 1, wherein in each of the color filters, the plurality of microstructures are configured to selectively allow red light from incident light to pass through the dielectric layer, or selectively allow green light from the incident light to pass through the dielectric layer, or selectively allow blue light from the incident light to pass through the dielectric layer.

10. A filter module, comprising:
  a plurality of color filters, wherein each of the color filters comprises:
    a first substrate,
    a metasurface structure, located on a side of the first substrate and comprising a plurality of microstructures periodically arranged,
    a dielectric layer, located on a side of the metasurface structure away from the first substrate and covering the metasurface structure, wherein a refractive index of the dielectric layer is different from a refractive index of the metasurface structure and the dielectric layer is made of a magneto-optic material, and
    a second substrate, located on a side of the dielectric layer away from the first substrate; and
  one or more control components, configured to adjust refractive indexes of dielectric layers so as to adjust wavelengths of visible light passing through the color filters;
  wherein the one or more control components correspond to the plurality of color filters one-to-one and each comprise:
    a light source; and
    a controller, connected to the light source and configured to control one or any combination of a frequency, a polarization state, and a light intensity of light emitted by the light source so as to control a refractive index of the magneto-optic material.

11. The filter module according to claim 10, wherein the magneto-optic material is a ferroelectric material.

12. The filter module according to claim 10, wherein each of the color filters further comprises:
  a first reflector, located on a side of the first substrate away from the second substrate; and
  a second reflector, located on a side of the second substrate away from the first substrate,
  wherein a space between the first reflector and the second reflector constitutes an optical resonant cavity.

13. The filter module according to claim 12, wherein the first reflector is a distributed Bragg reflector (DBR), and the second reflector is a DBR.

14. The filter module according to claim 13, wherein the first reflector comprises a plurality of first film layers and a plurality of second film layers alternately arranged in a direction perpendicular to the first substrate, and the second reflector comprises a plurality of first film layers and a plurality of second film layers alternately arranged in the direction perpendicular to the first substrate,
  wherein a product of a thickness and a refractive index of each of the first film layers is a quarter of a wavelength of light passing through a corresponding color filter, and a product of a thickness and a refractive index of each of the second film layers is a quarter of the wavelength of the light passing through the corresponding color filter.

15. An image sensor, comprising:
  a filter module, comprising:
    a plurality of color filters, wherein each of the color filters comprises:
      a first substrate;
      a metasurface structure, located on a side of the first substrate and comprising a plurality of microstructures periodically arranged,
      a dielectric layer, located on a side of the metasurface structure away from the first substrate and covering the metasurface structure, wherein a refractive index of the dielectric layer is different from a refractive index of the metasurface structure and the dielectric layer is made of a thermo-optic material, and
      a second substrate, located on a side of the dielectric layer away from the first substrate; and
    one or more control components, configured to adjust refractive indexes of dielectric layers so as to adjust wavelengths of visible light passing through the color filters; and
  a photosensitive layer, located on a side of the first substrate away from the second substrate;
  wherein the one or more control components correspond to the plurality of color filters one-to-one and each comprise:

a heating plate, located on the first substrate and at least partially surrounding the metasurface structure; and a controller, connected to the heating plate and configured to control the heating plate to heat the dielectric layer so as to control a refractive index of the thermo-optic material.

16. An imaging device, comprising an image sensor according to claim 15.

17. The image sensor according to claim 15, wherein the thermo-optic material is an SU-8 photoresist, Triazine-based Hyperbranched polymers (TZ001) or PMMA.

18. An image sensor, comprising:

a filter module according to claim 10, and a photosensitive layer, located on a side of the first substrate away from the second substrate.

19. The image sensor according to claim 18, wherein the magneto-optic material is a ferroelectric material.

20. An imaging device, comprising an image sensor according to claim 18.

* * * * *